H. L. FISHER.
ABSORPTION BOTTLE.
APPLICATION FILED MAY 13, 1919.
1,313,626.
Patented Aug. 19, 1919.
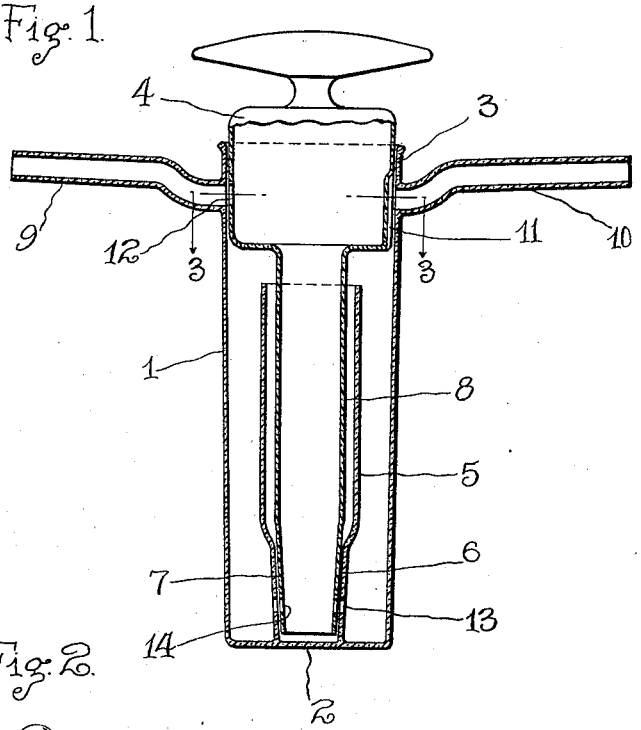
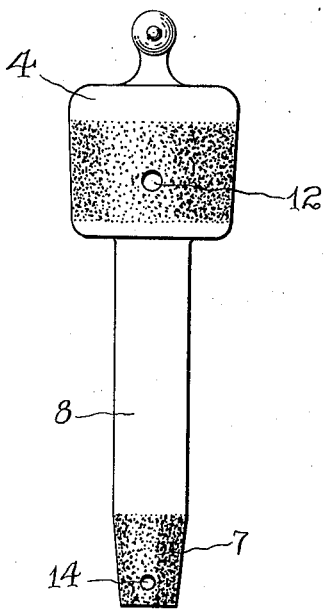
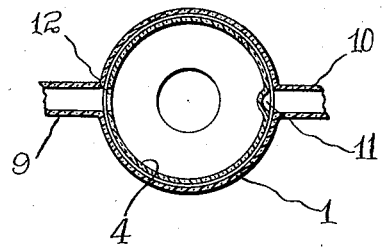
Harry L. Fisher, Inventor
By his Attorney

UNITED STATES PATENT OFFICE.

HARRY L. FISHER, OF NEW YORK, N. Y.

ABSORPTION-BOTTLE.

1,313,626.  Specification of Letters Patent.  Patented Aug. 19, 1919.

Application filed May 13, 1919. Serial No. 296,858.

*To all whom it may concern:*

Be it known that I, HARRY L. FISHER, a citizen of the United States, residing at borough of Manhattan, city, county, and State of New York, have invented a new and useful Improvement in Absorption-Bottles, of which the following is a specification.

This invention relates to absorption bottles for use in the quantitative analysis of organic and other substances, and my improvement is directed toward the production of a single piece of apparatus in which the determining of the carbon dioxid contents and desiccation of the residual gases may be conducted in a more accurate and efficient manner than has heretofore been possible.

Various forms of absorption bottles have previously been used in apparatus for analyses wherein attempts have been made to unite in one vehicle the functions of absorbing the carbon dioxid and of dehydrating the residual gases; it being understood that, for example, where moist soda lime is employed for absorbing the carbon dioxid, the gases will become charged with moisture and have therefore to be subjected to the influence of a drying agent before passing off from the bottle. But my experience has shown that with the present known combined vehicles inconvenience is experienced in handling the bottle and in preventing the atmosphere over the drying agent from communicating with the soda lime when the apparatus is not in use, so that the drying agent may then absorb moisture from the soda lime to the extent that it cannot be relied upon to desiccate the gases when the apparatus is in service. Under these circumstances the gases may leave the apparatus laden with more moisture than when they entered, and the gain in weight will not equal the total weight of carbon dioxid absorbed.

Therefore I have devised an absorption bottle adapted to contain both the soda lime and the drying agent, the bottle having ground glass closure joints which absolutely seal these elements in separate compartments away from each other, when not in use; while also having means whereby, for service, a partial turn of the stopper will open communication into the bottle, successively through the two compartments, and out from the bottle, thus permitting the gases to flow into the soda lime compartment and thence into contact with the drying agent.

A particular feature of invention in my improved absorption bottle is the provision of a single movable element, in the form of a stopper, to serve all the functions in the absorption train with the highest possible efficiency.

Other features and advantages of my said invention will hereinafter appear.

In the drawing:

Figure 1 is a sectional elevation of my improved absorption bottle.

Fig. 2 is a detail of the stopper with the extension, and

Fig. 3 is a section on the line 3—3 of Fig. 1.

In carrying out my invention I provide an outer tubular member 1, closed at one end 2 to form a flat base, upon which the device may stand upright, and having a ground seat 3 at the opposite, open end, to receive a hollow stopper 4, whose peripheral surface is also ground to fit closely in said seat. An inner tube 5 is fused at one end to the base 2 and extends upwardly therefrom in spaced, concentric relation with the outer tube, to a predetermined point below the stopper 4, the purpose of said tube 5 being to comprise, with the outer tube, an annular chamber to contain an absorption agent, such as soda lime, for carbon dioxid.

The inner tube 5, toward its base, is provided with an internal ground seat 6, which is adapted to receive the exteriorly ground surface 7 at the lower end of a tubular extension 8 of the hollow stopper 4, said extension 8 and the hollow stopper comprising a chamber whose purpose is to contain a drying agent.

Extending outwardly from the upper, or stopper seating portion of the member 1 are the oppositely arranged hollow branches 9, 10, for the purpose of connecting the absorption device with other members of the apparatus, both of these branches having open communication through the wall of said member 1. The hollow stopper has in its ground surface a small vertical depression 11 which extends to its inner perimeter and is adapted to register with one of the branches 9 or 10, to thus establish communication between a branch and the annular chamber formed by the member 1 and inner tube 5. Also the hollow stopper has an orifice 12 through its wall which is adapted to register with the other branch to establish communication between said branch and the interior of the hollow stopper and its extension 8. Since the branches 9 and 10 are arranged oppositely, and the depression 11 and orifice 12 in the stopper are also in opposite relation, the respective communications with the branches 9 and 10 will be effected coincidently by a suitable adjustment of the stopper, while a slight turning movement of the stopper will shut off both communications.

It has been noted that the extension 8 has a ground joint with the inner tube 5, so that the chambers which are provided respectively between the member 1 and inner tube 5, and within the hollow stopper and its extension, may be sealed against intercommunication. But when the absorption train is to be put in action, then it is necessary to open up communication between these chambers. Therefore I provide one or more orifices 13 through the wall of inner tube 5, at its ground portion, and also I provide one or more orifices 14 through the wall of the extension 8, at its ground portion, said orifices being so relatively arranged that they will register to open communication between the two chambers when the stopper is adjusted to open communication with the branches 9, 10, as previously recited, but the same turning movement of the stopper which serves to close the communication with the branches, also coincidently serves to turn the orifices 14 away from orifices 13 and thus to close the passage between the two chambers.

Attention is particularly directed to the condition which requires the ground surfaces in the member 1 and inner tube 5 to possess exactly the same degree of taper, in order that the stopper and its extension, whose ground surfaces must also possess exactly the same degree of taper, may perfectly coact to seat the two separated joints in unison, each with equal efficiency. The accurate performance of this dual grinding operation involves a high order of glass workers' skill, but has been carried out for me with entirely satisfactory results, so that with the stopper turned to close all the means of communication herein referred to, I have found no interaction to occur between the moisture from the soda lime and calcium chlorid contained respectively in the separated chambers in tests extending over considerable periods of time.

But when the stopper is turned to open up the complete train of flow, then the gases will pass from one branch into one of the chambers, thence into the other chamber, and out through the other branch. It is obviously due to the adjustment of the stopper in registering either the depression 11 or the orifice 12 with the inlet branch to determine whether the flow of gases shall be first into the outer chamber or the inner chamber of the absorption bottle.

My improved absorption bottle has the advantage that it can be more readily filled, because the inner tube, whose mouth can be temporarily stoppered, conveniently permits the outer chamber to be charged as with moist soda lime, and the stopper, with its extension 8 can of course, while separated, easily be charged with the drying agent, and then the two parts of the device are simply to be fitted together, with the points of communication out of registry, thereby effecting at once the complete sealed closure, when the absorption bottle is in readiness to be put into use.

Further, through the construction of parts described, and the ability to separate the two containers, they may be more readily emptied and cleansed than is possible with other types of apparatus designed for a similar purpose.

It should also be noted that the present device serves the purpose of two ordinary absorption tubes or bottles, and therefore only one weighing operation is necessary for a complete determination.

Variations may be resorted to within the spirit and scope of my said invention.

I claim:

1. An absorption bottle having an inner tube secured therein to form an annular chamber, and a hollow stopper having a tubular extension to form a chamber in concentric relation to said annular chamber, means of communication between said chambers, and means operable by a relative turning movement between said bottle and stopper, to open or close said means of communication.

2. An absorption bottle having a spaced inner tube, to form an annular chamber, said inner tube having an internal ground seat near its base, and a hollow stopper, with a tubular extension having a ground portion, said stopper seating within the mouth of the bottle, while the ground portion of its extension fits within the seat provided in said inner tube, said inner tube and extension having openings through their respective ground portions which may register to provide a communicating passage, or may be put out of alinement to close such passage, by a turning movement of the stopper.

3. In an absorption bottle having communicating branches and a hollow stopper to close said bottle and to both close and permit communication between said branches respectively, the bottle interior and the interior of the stopper, the combination of a tubular extension with a ground portion for said stopper, and said bottle having an inner tube with a ground seat to receive said ground portion for closure purposes, said ground seat and ground portion respectively having passages arranged to register for intercommunication between said bottle and the stopper only when the stopper is adjusted for communication with said branches.

In testimony whereof I have signed my name to this specification in the presence of two subscribing witnesses, this 7th day of May, 1919.

HARRY L. FISHER.

Witnesses:
FREDERIC W. ERB,
FRANK C. ERB.

Copies of this patent may be obtained for five cents each, by addressing the "Commissioner of Patents, Washington, D. C."